Oct. 28, 1924.  
E. L. YOUNG  
CONVEYER CHAIN  
Filed June 27, 1923  
1,513,080
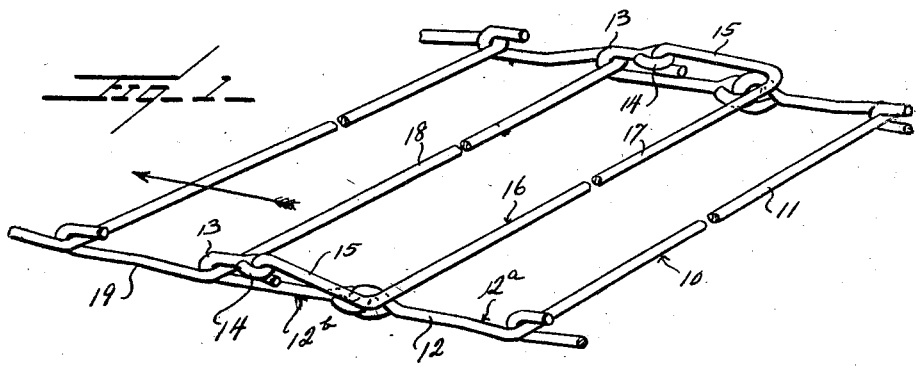
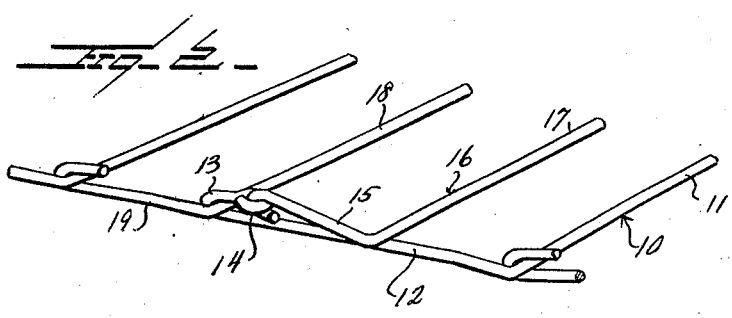
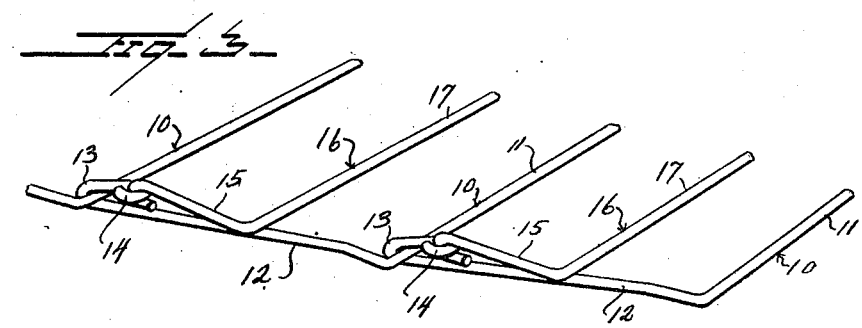
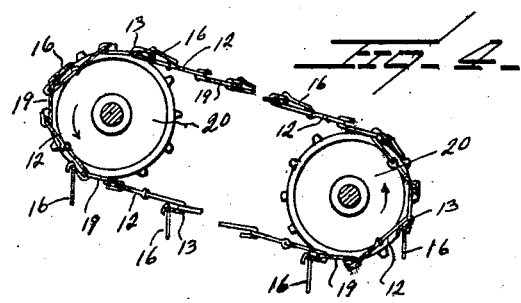
Inventor  
E.L. Young  
By Watson E. Coleman  
Attorney Patented Oct. 28, 1924.

1,513,080

UNITED STATES PATENT OFFICE.

ERNEST L. YOUNG, OF OLATHE, COLORADO.

CONVEYER CHAIN.

Application filed June 27, 1923. Serial No. 648,055.

*To all whom it may concern:*

Be it known that I, ERNEST L. YOUNG, a citizen of the United States, residing at Olathe, in the county of Montrose and State of Colorado, have invented certain new and useful Improvements in Conveyer Chains, of which the following is a specification, reference being had to the accompanying drawings.

This invention relates to improvements in conveyer chains and more particularly to a construction of the links thereof whereby a portion of the carrier surface is removed during the return flight movement of the links.

It is well known to those familiar with the use of potato diggers and the like and with other conveyers, where heavy articles are conveyed upon the upper flight and where the flight is perforated, certain of these heavy articles fall through the upper flight and striking the links of the lower flight, deform the same. Accordingly, an important object of this invention is to provide a link construction for use in conveyer flights by means of which a portion of the supporting surface as represented by the cross members of the links is so positioned during the return flight that falling articles will not engage with the same.

A further object of the invention is to provide a device of this character which may be readily constructed and very cheaply produced and which at the same time will be efficient and durable in service.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a perspective of one form of chain embodying links constructed in accordance with my invention;

Figure 2 is a fragmentary perspective of a modified form of chain, showing a modified construction of the link;

Figure 3 is a fragmentary perspective of a chain constructed entirely of links of the type shown in Figure 2; and Figure 4 is a diagrammatic view showing the operation of the drop link sections when the chain embodying the same is employed as a conveyer.

Referring now more particularly to the drawings, the numeral 10 indicates a chain link formed from a single strip of wire bent to form a bight portion 11 and arms 12, the link being substantially U-shaped. The ends of the arms 12 are uncinated, as indicated at 13, and the ends of the hooks have formed therein eyes 14. The eyes 14 have engaged therethrough the uncinated ends of arms 15 of a second U-shaped link 16, the arms 15 of which are of approximately one-half the length of the arms 12 of the link 10 so that the bight portion 17 of the link 16 or drop link when resting upon the arms 12 of the link 10 engages these arms approximately midway of their length. The arms 12 and 15 of the links 10 and 16 will be in-set adjacent their point of connection in the usual manner of constructing links of this character. The uncinated portions 13 of the arms 12 of the links 10 may be employed to engage the bight portion 11 of a similar link 10 or the bight portion 18 of a link 19 of ordinary construction.

In order that the arms 12 of the link 10 which are of considerably greater length (approximately double) than the ordinary link arm may not be subjected to too great a strain which would deform the same and in order that they might pass conveniently over the drive sprockets 20 of the conveyer of which they form a part, I preferably form these arms of two sections $12^a$ and $12^b$, the adjacent ends of which are pivotally connected, this pivotal connection permitting yielding of the arms without bending thereof either in response to weight placed thereon or in passing about the drive sprockets. As will be noted from an inspection of Figure 4, in operation of the chain upon the conveyer, as the drop link 16 is supported only by its pivotal engagement with the link 10, during a return flight the drop link 16 will depend leaving a space between the bight portions of adjacent links 10 or 10 and 19 as the case may be vacant to permit the passage of falling articles. As the chain passes about the curve of the sprocket, these links force against the arms 12 of the link 10 with which they are associated and are supported thereby throughout the operative flight.

It will be obvious that a chain, the links of which are constructed in accordance with the foregoing, will prevent the deformation of the links above mentioned and in addition will permit stones and the like to pass through the lower conveyer flight to fall to the ground, thus eliminating further disadvantage of the ordinary chain construction in which the stones falling through the upper flight, which is stretched, come to rest upon the lower flight and are drawn with the chain to the lower sprocket where they collect in large quantities and eventually prevent the operation of the machine until they are removed.

I claim:—

1. In a conveyer chain, a link comprising a substantially U-shaped member having its arms uncinated, the ends of the hooks being provided with eyes, and a drop link likewise U-shaped in construction and having the ends of its arms uncinated and directed through the eyes of the hooks of the first named link, the arms of the second link being of substantially one-half the length of the arms of the first named link.

2. In a conveyer chain, a link comprising a substantially U-shaped member having its arms uncinated, the ends of the hooks being provided with eyes, and a drop link likewise U-shaped in construction and having the ends of its arms uncinated and directed through the eyes of the hooks of the first named link, the arms of the second link being of substantially one-half the length of the arms of the first named link, the arms of the first named link being each composed of a pair of sections pivotally connected at adjacent ends.

3. In a conveyer chain, a link comprising a U-shaped member having the ends of the arms thereof adapted for pivotal engagement with the bight portion of a second link and for pivotal engagement with the ends of the arms of a third link.

4. In a conveyer chain, a link comprising a U-shaped member having the ends of the arms thereof adapted for pivotal engagement with the bight portion of a second link and for pivotal engagement with the ends of the arms of a third link, the arms of the third link being of less length than the arms of the first named link, and the bight portion of the third link being of greater length than the distance between the arms of the first named links whereby said bight portion during an operative flight of the links will engage upon the arms of the first named link.

5. In a conveyer chain, a link comprising a U-shaped member having the ends of the arms thereof adapted for pivotal engagement with the bight portion of a second link and for pivotal engagement with the ends of the arms of a third link, the arms of the third link being of less length than the arms of the first named link and the bight portion of the third link being of greater length than the distance between the arms of the first named links whereby said bight portion during an operative flight of the links will engage upon the arms of the first named link, the arms of the first named link being formed of sections pivotally connected at the point of engagement thereof by the bight portion of the third link.

In testimony whereof I hereunto affix my signature.

ERNEST L. YOUNG.